(12) United States Patent
Yu et al.

(10) Patent No.: US 8,479,709 B2
(45) Date of Patent: Jul. 9, 2013

(54) AUTOMOTIVE LINE BUNDLING SYSTEM

(75) Inventors: Dequan Yu, Ann Arbor, MI (US); Ram Alluri, Troy, MI (US); Larry Castleberry, Detroit, MI (US); Carlos Armesto, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 525 days.

(21) Appl. No.: 12/768,580

(22) Filed: Apr. 27, 2010

(65) Prior Publication Data

US 2011/0260011 A1   Oct. 27, 2011

(51) Int. Cl.
F02M 55/02   (2006.01)

(52) U.S. Cl.
USPC ............... 123/469; 123/509; 248/68.1

(58) Field of Classification Search
USPC ............... 123/461, 469, 509; 180/69.4
See application file for complete search history.

(56) References Cited

U.S. PATENT DOCUMENTS

| | | | |
|---|---|---|---|
| 3,250,502 A | 5/1966 | Robinson | |
| 4,040,586 A | 8/1977 | Newsteder | |
| 4,510,909 A * | 4/1985 | Elphick et al. | 123/470 |
| 4,705,244 A * | 11/1987 | Saotome et al. | 248/68.1 |
| 4,763,633 A * | 8/1988 | Nakanishi | 123/514 |
| 5,413,468 A | 5/1995 | Tuckey | |
| 5,445,503 A * | 8/1995 | Kmiec et al. | 417/360 |
| 5,562,429 A | 10/1996 | Romstad et al. | |
| 6,036,145 A * | 3/2000 | Calabrese et al. | 248/68.1 |
| 6,241,198 B1 | 6/2001 | Maruyama | |
| 6,802,539 B2 * | 10/2004 | Cooke et al. | 285/124.1 |
| 6,817,337 B1 * | 11/2004 | Siring et al. | 123/198 E |
| 6,915,870 B2 * | 7/2005 | Sugiyama et al. | 180/69.4 |
| 6,915,990 B2 | 7/2005 | Maruyama | |
| 7,159,576 B2 * | 1/2007 | Yamashita et al. | 123/509 |
| 7,273,037 B2 * | 9/2007 | Kondo | 123/456 |
| 7,594,583 B2 * | 9/2009 | Whipple | 220/86.2 |
| 7,806,213 B2 * | 10/2010 | Inoue et al. | 180/69.4 |
| 2005/0067548 A1 * | 3/2005 | Inoue | 248/635 |
| 2009/0260600 A1 * | 10/2009 | Kim | 123/509 |

FOREIGN PATENT DOCUMENTS

| | | |
|---|---|---|
| JP | 9177637 A | 7/1997 |
| JP | 9250517 A | 9/1997 |

* cited by examiner

*Primary Examiner* — Bradley Duckworth
(74) *Attorney, Agent, or Firm* — Julia Voutyras; Alleman Hall McCoy Russell & Tuttle LLP

(57) ABSTRACT

A system of alternate hose line bundling allows for exclusion of a higher pressure hose line from fasteners directly attached to a vehicle body. Alternatively to mounting to the vehicle body, the higher pressure hose line is coupled to a lower pressure hose line via fasteners which lack mounting features. Eliminating attachment of higher pressure hose lines to the vehicle body reduces noise, vibration, and harshness (NVH) experienced by passengers in the vehicle.

18 Claims, 5 Drawing Sheets

AUTOMOTIVE LINE BUNDLING SYSTEM

FIELD

The present application relates to a hose line coupling system, such as a fuel line coupling system, within a structure such as an automotive body.

BACKGROUND AND SUMMARY

Vehicle component hose lines, such as fuel lines, brake oil lines, a fuel return and/or vapor lines, may be bundled together to form line bundles. The line bundle may be secured to a structure of a vehicle, such as an automotive body, via a plurality of plastic fasteners positioned at various locations along the line bundle. One or more of the lines in a line bundle may experience high pressure pulsations, generated by a fuel pump, for example. These pressure pulsations may be transmitted, through the fasteners, to the vehicle body, thereby increasing noise, vibration, and harshness (NVH) experienced by passengers in the vehicle.

In one approach, described in Japanese Patent Laid-Open No. 9-250517, insulating strategies are employed within a single fastener directly attaching a fuel line to a body. Specifically, insulation is achieved by combining a flexible plastic material such as rubber with a rigid plastic material. In another example, described in U.S. Pat. No. 5,413,468, a hollow pulse dampener may be included in the fuel line. Specifically, blow-mold technology is employed to produce a pulse dampener.

The inventors herein have recognized that the insulation technique may require two plastic materials, which increases cost and still may not sufficiently reduce NVH. Further, even with the pulse dampener, pressure pulsations may still exist and thus transmit unacceptably high levels of NVH to the automotive body.

The above issue may be at least partly addressed by a system for a vehicle having a body, comprising: a first bundle fastener secured to the body; a second bundle fastener not secured to the body; a lower pressure-hose line coupled to the first bundle fastener at a first location and the second bundle fastener at a second location; and a higher pressure-hose line coupled to the second bundle fastener at the second location and not coupled to the first bundle fastener.

In this way, it is possible to secure the higher pressure-hose line to the body via an indirect coupling to the body through the lower pressure-hose line. For example, because the high pressure-hose line is not directly coupled to the vehicle body through either of the fasteners, it is possible to reduce NVH transmitted to the body, while still retaining the line bundle of the higher and lower pressure hose lines by securing the line bundle with clips that are floating relative to the vehicle body. The second fastener mechanism, coupling the higher pressure-hose line to the lower pressure-hose line thus allows for the higher pressure-hose line to be secured within the automotive body, yet without a direct transmission source from the higher pressure-fuel line to the vehicle body, for example.

While such an approach can significantly reduce NVH, of course it may be combined with other approaches, such as the pulse dampener, or specially designed fasteners, if desired. For example, inclusion of an integrated fuel line dampener at a highest pressure pulsation area relative to a fuel pump further reduces NVH caused by fuel line bundling within an automotive body.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
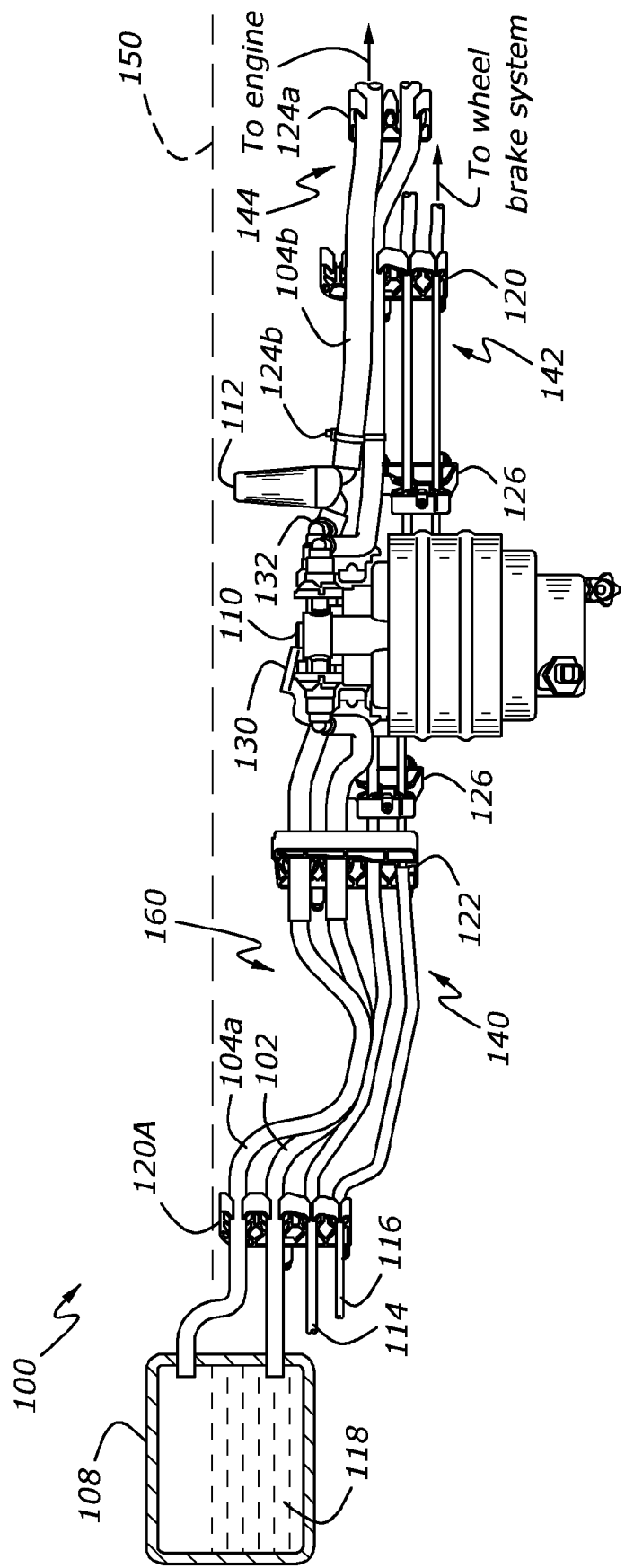
FIG. 1 shows an example embodiment of a fuel line bundling system in a diesel direct injection fuel system with NVH reducing features.

The following description relates to a system of alternative fuel line coupling for reduction of NVH. As shown in FIG. 1, NVH reducing features may include two spacer clips/straps that couple the higher-pressure fuel line to the lower-pressure fuel return line via a fastener that lacks mounting features, as illustrated in FIGS. 1-3 and 6. The fuel return line may be further bundled with two brake oil lines and secured to the vehicle body via fasteners with mounting features, as illustrated in FIGS. 1-3 and 4. NVH reducing features also include a pressure pulse dampener shown in FIG. 1, which is incorporated into the fuel pump outlet valve at the highest pressure pulsation area of the fuel line. Thus, vibration of the fuel line may be reduced as well as transmission of vibration to the vehicle body FIG. 1 shows a schematic illustration of fuel line bundling system 100 in a diesel direct injection fuel system. In general, fuel line bundling system 100 may direct fuel 118 from fuel supply 108 to fuel pump 110. Within fuel pump 110 positive pressure may be generated to force fuel 118 into an engine. Fuel 118 may be directed from fuel supply 108 to fuel pump 110 via lower pressure-fuel line 104a connected at fuel pump inlet valve 130. Hose lines up stream of fuel pump 110 in the direction of fuel 118 flow may be considered to be located in a lower pressure area.

Within fuel pump 110 high pressure may be generated via a pumping system. The rearmost side of fuel pump 110 may be secured to the vehicle body 160 (shown in FIGS. 2 and 3). For example, a bracket may be attached to the rearmost side of the fuel pump and may be further mounted to the vehicle body with threaded bolts. Alternatively, the body of the fuel pump may be designed with mounting features so that it may be directly attached to the body of the vehicle. The vehicle body 160 may be a vehicle rail, such as in a body-on-frame vehicle configuration. Alternatively, vehicle body 160 may be a portion of a uni-body construction element of the vehicle.

Fuel 118 may be expelled from fuel pump 110 creating a high pressure pulsation area downstream of fuel pump 110 in the direction of fuel 118 flow. High pressure pulsations may generate oscillations of higher pressure-fuel line 104b, which may then be transferred to the vehicle body 160 as NVH.

Integrated fuel line dampener 112 may be incorporated into fuel pump outlet valve 132 and may extend upward in a perpendicular orientation from higher pressure-fuel line 104b. Integrated fuel line dampener 112 may be a short hollow pipe connected via an open-end to higher pressure-fuel line 104b. It may relieve pressure pulsations by expansion and contraction of an air pocket at an opposing closed end in response to fluctuations in fuel 118 flow. In an alternate embodiment, integrated fuel line dampener 112 may include a flexible membrane at a closed end, which may also expand and contract in response to pressure pulsations. Hose lines upstream of fuel pump 110 in the direction of fuel 118 flow may be considered to be located in a high pressure pulsation area, as compared to the lower pressure area noted above.

Fuel return line 102 may be a lower pressure-hose line, as compared to the higher pressure-fuel line 104b described above. Fuel return line 102 may direct unused fuel 118 back from the engine through fuel pump 110 and into fuel supply 108. Fuel line 104 (104a and 104b) and fuel return line 102 may traverse a common pathway 150 within the vehicle body. Pathway 150 may also be shared with other low pressure-hose lines, as compared to higher pressure-fuel line 104b described above. Other lower pressure-lines that share pathway 150 may include brake oil lines 114 and 116, which may be smaller in diameter than fuel line 104 and fuel return line 102.

Figure 2:
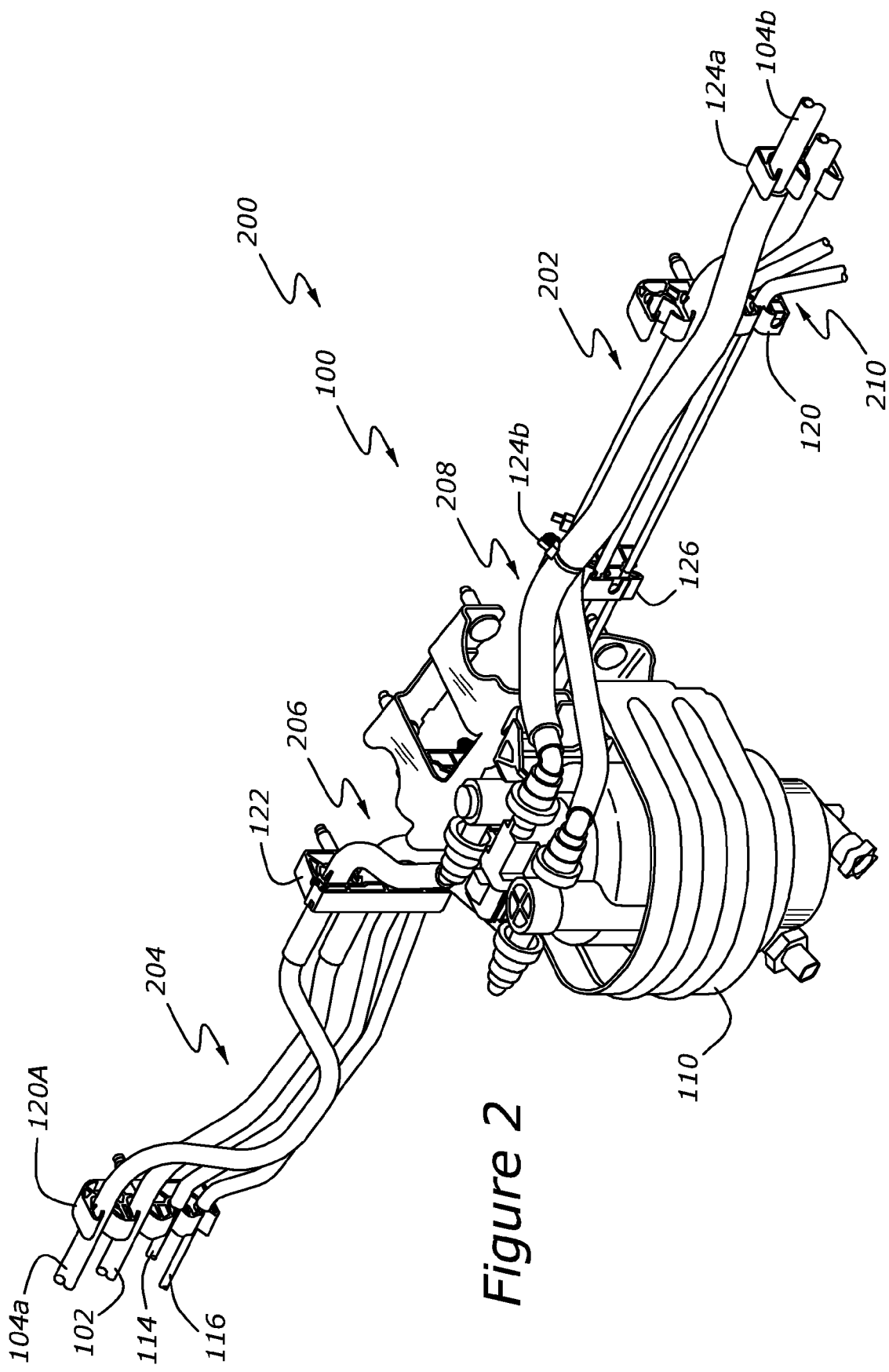
FIG. 2 shows an angled view of the fuel line bundling system of FIG. 1.

Pathway 150 is shown to be generally linear but may advance in various directions in 3-dimensional space so as to accommodate other vehicle parts, the shape of vehicle body 160, or curvature of the hose lines. Specifically, curvature 206 and 208 of FIG. 2 show that fuel line 104 and fuel return line 102 may extend inward to connect to both left and right sides of fuel pump 110 relative to the rearmost side attached to vehicle body 160, while brake oil lines 114 and 116 may extend straight behind the fuel pump 110. In addition, lower pressure-fuel line 104a may curve inward in the region between fasteners 120A and 122 (curvature 204 of FIG. 2). Pathway 150 may extend a minimum length, which to direct hose lines to their points of diversion. As is shown in FIG. 2, for example, brake oil lines 114 and 116 may diverge away from pathway 150 inwardly toward the wheel brake system (curvature 210), while higher pressure-fuel line 104b and fuel return line 102 may continue forward toward the engine.

Fuel line 104, fuel return line 102, and brake oil lines 114 and 116 may comprise a bundle of hose lines 140, which may be secured via plastic bundle fasteners, upstream of fuel pump 110, directly to vehicle body 160. Herein, bundle of hose lines 140, including fuel return line 102 and brake oil lines 114 and 116, and lower pressure-fuel line 104a, may be secured directly to vehicle body 160 via fasteners 122 and 120A, upstream of fuel pump 110 in the lower pressure area. Fastener 122 may be positioned proximate to fuel pump 110, while fastener 120A may be positioned further upstream than fastener 122.

Fasteners 122 and 120A may be fabricated from at least one type of plastic and may have at least four adjacent hose holding portions. From top to bottom, hose lines 104a, 102, 114, and 116 may be secured into hose holding portions of fasteners 122 and 120A. Hose holding portions of fastener 122 may have a lidded-top design and fasten lines in an encompassing manner so that hose lines are reversibly affixed (further depicted in FIG. 5). Hose holding portions of fastener 120A may have an open-side design and may fasten lines in a non-encompassing manner so that hose lines may be reversibly affixed (further depicted in FIG. 4). Fasteners 122 and 120A may each be secured to vehicle body 160 by the mechanism shown in FIG. 3 (discussed later).

Higher pressure-fuel line 104b may be excluded from bundle of hose lines 142, so that bundle of hose lines 142 may include fuel return line 102 and brake oil lines 114 and 116. Bundle of hose lines 142 may be secured via fastener 120, which may be secured directly to vehicle body 160. Fastener 120 may be fabricated from at least one type of plastic and may have four adjacent hose holding portions. From top to bottom, wherein the first hose holding portion is empty, hose lines 102, 114, and 116 may be secured into fastener 120 in a non-encompassing manner. In this embodiment, fastener 120 may have an open-top design so that hose lines may be reversibly affixed.

Fastener 120 may be secured to vehicle body 160 (mechanism shown in FIG. 3) downstream of fuel pump 110, on the opposing side from fasteners 122 and 120A. The distance between fastener 120 and fuel pump 110 may be greater than the distance between fastener 120 and fuel pump 110, and may be approximately equal to the distance between fastener 120A and fuel pump 110.

Exclusion of higher pressure-fuel line 104b from bundle of hose lines 142 may enable attachment of solely lower pressure-hose lines directly to vehicle body 160 via fastener 120. Therefore, oscillations that occur in higher pressure-fuel line 104b may not be transmitted to the vehicle body via fastener 120 and NVH may be reduced.

However, higher pressure-fuel line 104b may still be coupled within pathway 150 in order that it may maintain proper function in transfer of fuel 118 to the engine, and so that it may not disrupt other automotive parts. For this purpose, fuel line bundling system 100 may include one or more fasteners 124 (124a and 124b), which may couple fuel line 104b to fuel return line 102, creating secondary bundle of hose lines 144, but remain unattached to vehicle body 160.

Fasteners 124a and 124b may be fabricated from materials such as plastic or nylon and may be affixed on the upstream and/or downstream sides of fastener 120. In the present embodiment, wherein two fasteners 124 are shown, 124a is a fastener fabricated from at least one type of plastic and 124b is two linked cable ties fabricated from nylon. Fastener 124a may have two non-encompassing hose holding portions, wherein fuel line 104a may be held in the top hose holding portion and fuel return line 102 may be held in the bottom hose holding portion (shown in FIG. 6 as 602 and 604, respectively). In this embodiment, fastener 124a may have an open-top design so that hose lines may be reversibly affixed. Fastener 124b may be comprised of two permanently linked standard nylon cable ties, one encompassing fuel line 104b and one encompassing fuel return line 102. Fasteners 124 a and b float relative to the vehicle body.

Fastener 124a may be affixed to hose lines 104b and 102 at a position in pathway 150 that is downstream and proximate to fastener 120. Fastener 124b may be at a point in pathway 150 that is downstream and proximate to fuel pump 110. Because higher pressure-hose line 104b may be excluded from fastener 120, it may curve slightly inward toward the center of the vehicle body and away from bundle of hose lines 142 (shown in FIG. 2). As is seen in FIG. 2 angled-view 200 of fuel line bundling system 100, curvature 202 may prevent contact of fuel line 104b with vehicle body 160 and may aid in diminishment of NVH.

Brake oil lines 114 and 116 may be further secured to vehicle body 160 via two additional plastic fasteners 126, which may lie closer-in on the upstream and downstream sides of fuel pump 110 than fasteners 122 and 124b. Both fasteners 126 may be non-encompassing and may have an open-side design so that brake oil lines 114 and 116 may be reversibly affixed. Each fastener 126 may be directly attached to vehicle body 160 (mechanism shown in FIG. 3) and may be fabricated from at least one type of plastic.

Figure 3:
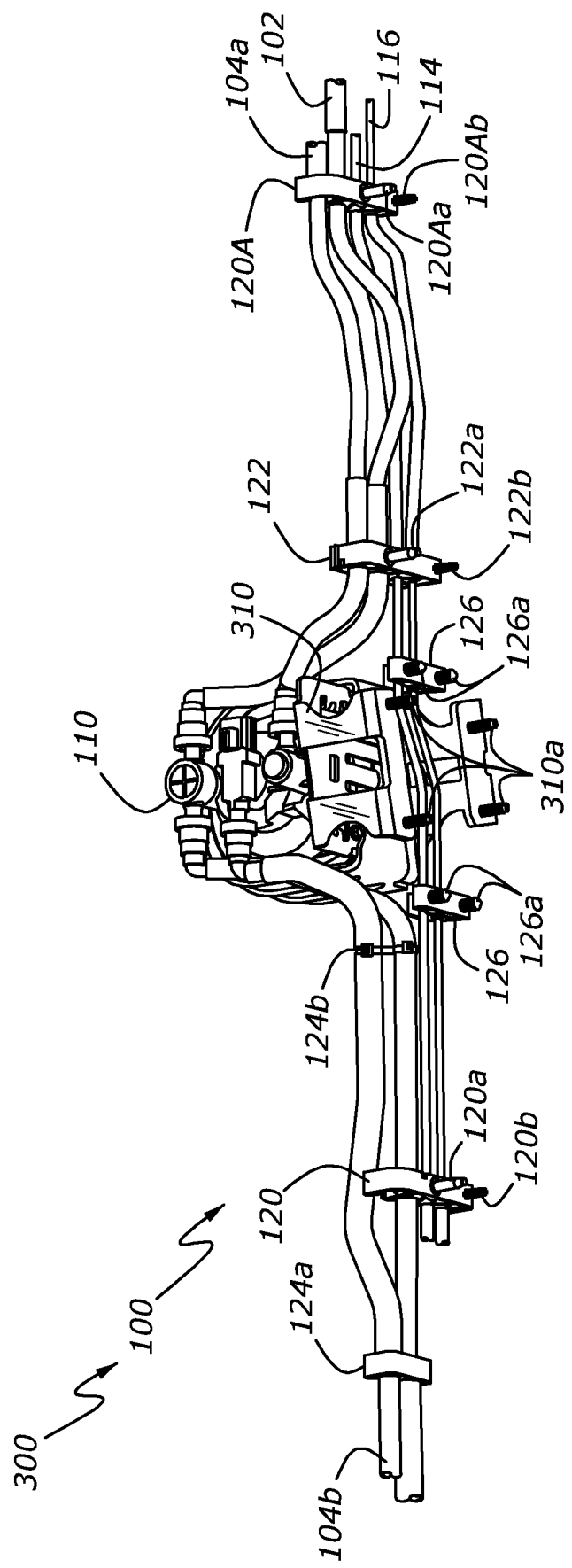
FIG. 3 shows a back view of the fuel line bundling system of FIG. 1.

FIG. 3 includes back-view 300 of fuel line bundling system 100, wherein mounting strategies for each fastener and fuel pump 110 are apparent. Fasteners 120, 122, and 120A may each be attached to the vehicle body via one unthreaded push-in fastener (120a, 122a, 120Aa, respectively) and a holding pin (120b, 122b, and 120Ab, respectively). In all cases, the push-in fasteners may be disposed above the holding pins at opposing ends of the rearmost sides of fasteners. Brake oil line fasteners 126 may each be attached to the vehicle body via two threaded bolts 126a at opposing ends of the rearmost side of fasteners. In the present embodiment, the rearmost side of fuel pump may be attached to square-shaped bracket 310, which may be further mounted to the vehicle body via four threaded bolts 310a at four corners of the bracket. Fasteners 124a and 124b may not be mounted to the vehicle body, and therein may lack studs or holding pins.

Figure 4:
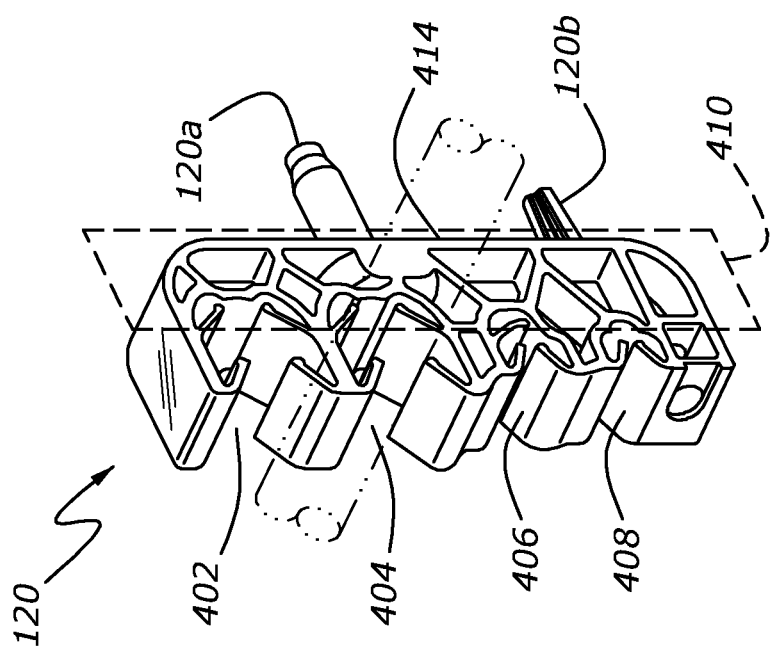
FIG. 4 shows an example embodiment of an open-top fastener with mounting features.

FIGS. 4-7 show detailed depictions of plastic fasteners that constitute one example embodiment of the fuel line bundling system 100. FIG. 4 includes a diagram of fastener 120, which in this embodiment may have an identical structure as fastener 120A. Fastener 120 may have four open-top hose holding portions: two larger that may accommodate fuel return line 102 and fuel line 104 (402 and 404, respectively), and two smaller that may accommodate brake oil lines 114 and 116 (406 and 408, respectively). Hose holding portions 402 and 404 may have a width greater than hose holding portions 406 and 408, which correlates to the diameters of hose lines accommodated therein. Hose holding portions 402 and 404 may each have two overhanging flap portions and two under-hanging flap portions for securing hose lines 102 and 104. Hose holding portion 406 may have two overhanging flap portions and one flap under-hanging portion for securing brake oil line 114. Hose holding portion 408 may have two overhanging flap portions and may lack under-hanging flap portions for securing brake oil line 116.

Hose holding portions 402-408 may be supported by base 414 and a set of internal reinforcement walls 410. Set of internal reinforcement walls 410 may extend inward from base 414 and may include a network of six vertical walls, seven angled walls, and one horizontal wall. Mounting features, stud 120a and holding pin 120b may extend from the opposing side of base 414 for mounting of fastener 120.

Figure 5:
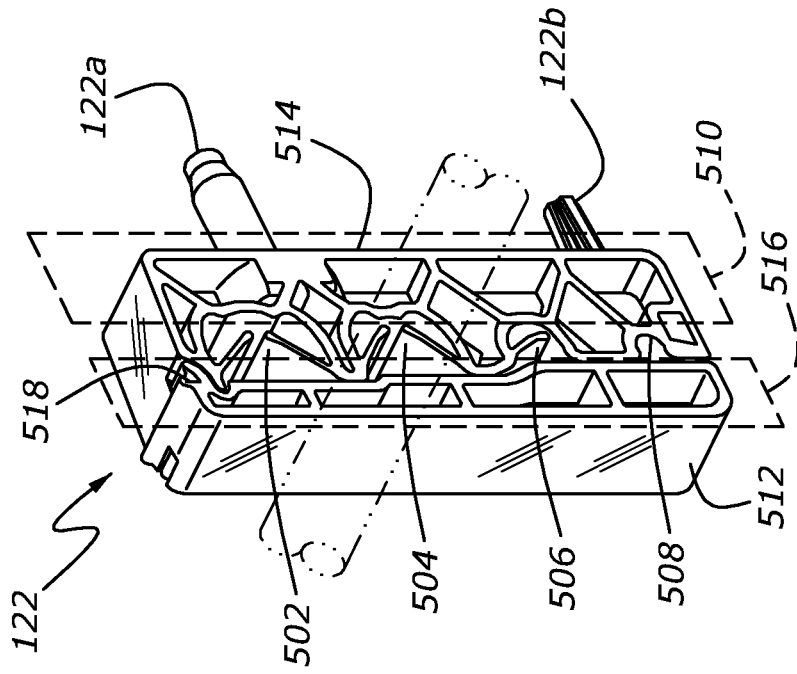
FIG. 5 shows an example embodiment of a lidded-top fastener with mounting features.

FIG. 5 includes a diagram of fastener 122. Fastener 122 may have four open-top hose holding portions: two larger that may accommodate fuel return line 102 and fuel line 104 (502 and 504, respectively), and two smaller that may accommodate brake oil lines 114 and 116 (506 and 508, respectively). Hose holding portions 502 and 504 may have a width greater than hose holding portions 506 and 508, which correlates to the diameters of hose lines accommodated therein. Hose holding portions 502 and 504 may each have two under-hanging flap portions for securing hose lines 102 and 104. Hose holding portion 506 may have one under-hanging flap portion for securing brake oil line 114. Hose holding lacks under-hanging flap portions for securing brake oil line 116.

In place of overhanging flap portions, fastener 122 may further include lid 512. Lid 512 may be disposed over the tops of hose holding portions 502-508 for securing of hose lines. Lid 512 may be rotatable around a lower end of fastener 122 and may be latched to fastener 122 by clasp 518 on an opposing end. Lid 512 may have its own set of internal support walls 516, which includes a base wall and a top wall extending the length of fastener 122, and four shorter vertical walls.

Hose holding portions 502-508 may be supported by base 514 and set of internal reinforcement walls 510. Set of internal reinforcement walls 510 may extend inward from base 414 and may include a network of five vertical walls, seven angled walls, and one horizontal wall. Mounting features, stud 122a and holding pin 122b may extend from the opposing side of base 514 for mounting of fastener 122.

Figure 6:
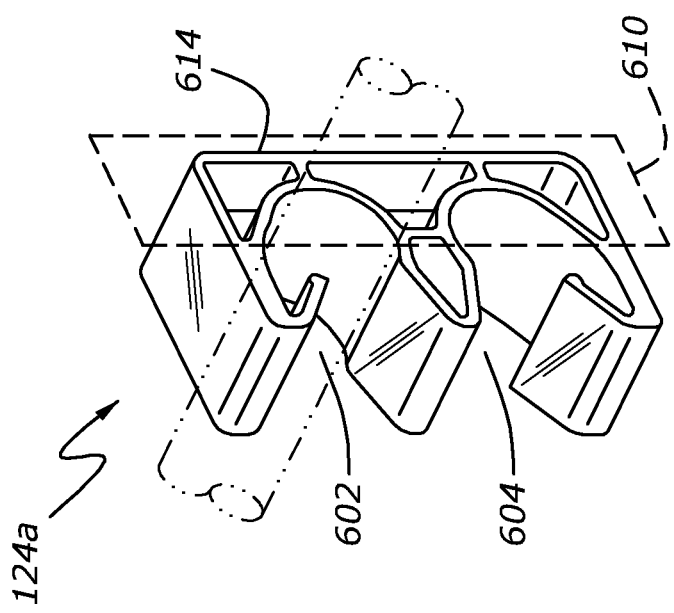
FIG. 6 shows an example embodiment of an open-top fastener lacking mounting features.

FIG. 6 includes a diagram of spacer clip 124a. Spacer clip 124a may have two hose holding portions: two larger that may accommodate fuel return line 102 and fuel line 104b (602 and 604, respectively). Hose holding portions 602 and 604 may have a width greater than hose holding portions 406, 408, 506, and 508, which correlates to the diameter of hose lines accommodated therein. Hose holding portions 602 and 604 may each have two overhanging flap portions and may lack under-hanging flap portions for securing hose lines 102 and 104b.

Hose holding portions 602 and 604 may be supported by base 614 and a set of internal reinforcement walls 610. Set of internal reinforcement walls 610 may extend inward from base 414 and may include a network of four vertical walls and one horizontal wall. The opposing side of base 614 is flat, as it may lack mounting features.

Figure 7:
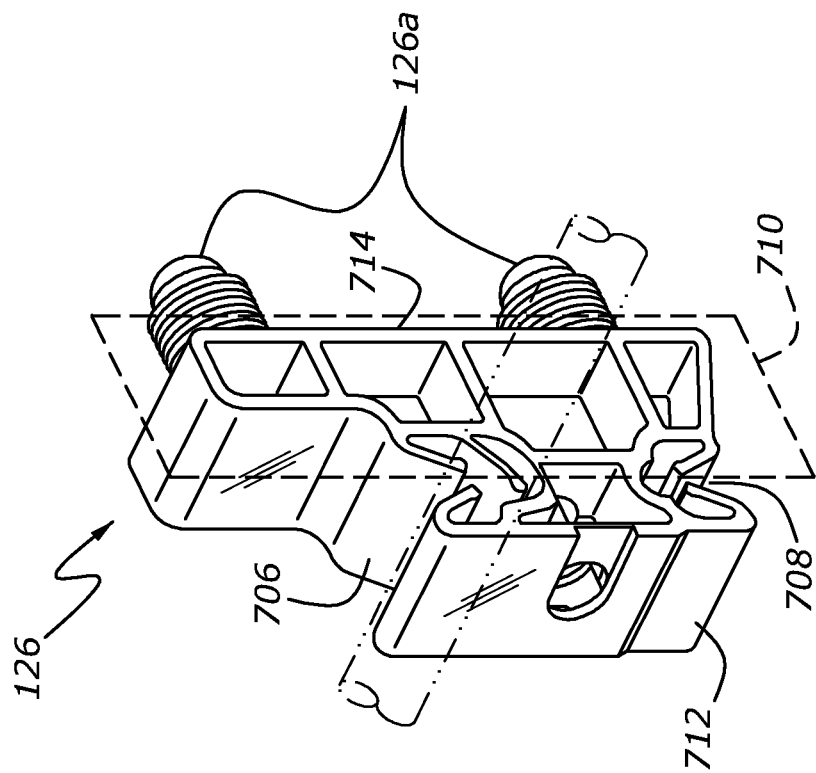
FIG. 7 shows an example embodiment of an open-side fastener with mounting features.

FIG. 7 includes a diagram of one fastener 126, which in this embodiment may have an identical structure as the other fastener 126. Fastener 126 may have two open-side hose holding portions: two smaller that may accommodate brake oil lines 114 and 116 (406 and 408, respectively). Hose holding portions 706 and 708 may have a width less than hose holding portions 402, 404, 502, 504, 602, and 604, which correlates to the diameter of hose lines accommodated therein. Hose holding portion 706 may have two overhanging flap portions and one under-hanging flap portion for securing brake oil line 114. Hose holding portion 708 may have two overhanging flap portions and may lack under-hanging flap portions for securing brake oil line 116.

Hose holding portions 706 and 708 may be supported by base 714 and a set of internal reinforcement walls 710. Set of internal reinforcement walls 710 may extend inward from base 414 and may include a network of four vertical walls, one angled wall, and one horizontal wall. Mounting features, threaded bolts 126a, may extend from the opposing side of base 714 for mounting of fastener 126. Because hose holding portions 706 and 708 may open to the sides, fastener 126 further includes a top wall 712.

It may be appreciated that in alternate embodiments, spacing of fasteners relative to each other and the fuel pump 110 may vary. For example, the distance between fastener 120A and fuel pump 110 may be larger or smaller than distance between fastener 120 and fuel pump 110. Also, the open-top, open-side, or lidded-top design of fasteners may be substitutable.

Additionally, alternative bundling may be used, wherein lower pressure-fuel return line 102 may also be excluded from bundle of hose lines 142 and fastener 120 if a second set of fasteners, substantially similar to fasteners 124a and b, are used to couple fuel return line 102 to brake oil lines 114 and 116. This may be particularly true if other lower pressure or higher pressure-hose lines share pathway 150 and are incorporated into the fuel line bundling system. Accordingly, the number of fasteners and hose holding portions per fastener may vary to accommodate other hose lines that may traverse pathway 150.

Also, a gasoline direct injection (GDI) fuel system may have generally the same schematic as is shown in FIGS. 1-3; however, the higher pressure pulsation area may be located at the fuel pump inlet valve 130, and therefore fuel line dampener 112 (shown in FIG. 1 only) may be incorporated therein, rather than at outlet valve 132. In addition, fuel return line 102 may instead be a vapor line in a GDI fuel system, which, like fuel return line 102, is a lower pressure-hose line.

It will further be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system for a vehicle having a body, comprising:
a first bundle fastener secured to the body;
a second bundle fastener not secured to the body;
a lower-pressure hose line coupled to the first bundle fastener at a first location and the second bundle fastener at a second location; and
a higher-pressure hose line coupled to the second bundle fastener at the second location and not coupled to the first bundle fastener, the lower-pressure hose line and the higher-pressure hose line comprising a bundled group of hose lines traversing a common pathway; and
a third bundle fastener that couples the higher-pressure hose line to the lower-pressure hose line at a third location;
wherein the first location is between the second location and the third location along the common pathway of the bundled group of hose lines.

2. The system of claim 1, further comprising a fuel pump, generating high pressure pulsations at an outlet thereby creating a high pressure pulsation area downstream of the fuel pump,
the fuel pump outlet being connected to the higher-pressure hose line.

3. The system of claim 1, wherein the bundled group of hose lines further includes additional lower-pressure hose lines.

4. The system of claim 1, wherein the higher-pressure hose line is a fuel line.

5. The system of claim 1, wherein the lower-pressure hose line is a fuel return line in a diesel direct-injection fuel system.

6. The system of claim 1, wherein the lower-pressure hose line is a vapor line in a gasoline direct-injection fuel system.

7. The system of claim 1, wherein the first bundle fastener is fabricated from at least one type of plastic.

8. The system of claim 1, wherein the second bundle fastener is fabricated from at least one type of plastic.

9. The system of claim 1, wherein the third bundle fastener is fabricated from two nylon straps.

10. The system of claim 1, wherein the system includes a fuel pump and the first, the second, and the third locations are in a high pressure pulsation area downstream of the fuel pump and are opposite a lower pressure area upstream of the fuel pump.

11. The system of claim 1, wherein the system includes a direct-injection fuel pump.

12. The system of claim 1, wherein a fourth bundle fastener couples all hose lines in the bundled group of hose lines directly to the body of the vehicle at a fourth location; and,
the bundled group of hose lines includes additional lower-pressure hose lines.

13. The system of claim 12, wherein the fourth bundle fastener is fabricated from at least one type of plastic.

14. The system of claims 12, wherein the system includes a fuel pump; and,
the fourth location is in a lower pressure area upstream of the fuel pump and is opposite a high pressure pulsation area downstream of the fuel pump.

15. A system for a vehicle having a body, comprising:
a diesel direct-injection fuel pump;
a first bundle fastener secured to the body via a push-in fastener;
a second bundle fastener floating relative to the body and not secured to the body;
a lower-pressure hose line coupled to the first bundle fastener at a first location and the second bundle fastener at a second location different from the first location; and
a higher-pressure hose line coupled to the second bundle fastener at the second location and not coupled to the first bundle fastener, the higher-pressure hose line coupled to the fuel pump, the fuel pump positioned between a fuel tank and the second bundle fastener, and between the first bundle fastener and the second bundle fastener.

16. The system of claim 15 wherein the first location is downstream of the fuel pump in a high pressure pulsation area.

17. The system of claim 15 wherein the second location is downstream of the fuel pump in a high pressure pulsation area.

18. A system for a vehicle having a body, comprising:
a direct-injection fuel pump, generating high pressure pulsations at its outlet thereby creating a high pressure pulsation area downstream of the fuel pump;
a first bundle fastener secured to the body via a push-in fastener in a first location downstream of the fuel pump;
a second bundle fastener floating relative to the body and not secured to the body in a second location downstream of the fuel pump;
a third bundle fastener floating relative to the body and not secured to the body in a third location downstream of the fuel pump, the first location being between the second and the third locations;
a fourth bundle fastener secured to the body via a push-in fastener in a fourth location in a lower pressure area upstream of the fuel pump, on the opposing side from the first, the second, and the third fasteners;
a lower-pressure hose line coupled to the first bundle fastener at the first location, the second bundle fastener at the second location, the third bundle fastener at the third location, and the fourth bundle fastener at the fourth location, where each of the locations are distinct from each other;
a higher-pressure hose line coupled to the second bundle fastener at the second location, the third bundle fastener at the third location, the fourth bundle fastener at the fourth location, and not coupled to the first bundle fastener, the higher-pressure hose line curving away from the vehicle body between the second and third locations and further coupled to the fuel pump outlet; and a plurality of other lower-pressure hose lines coupled to the first bundle fastener at the first location, the fourth bundle fastener at the fourth location, and not coupled to the second and third bundle fasteners.

* * * * *